United States Patent [19]
Schmitt

[11] 3,748,948
[45] July 31, 1973

[54] FATIGUE RESISTANT FASTENERS

[75] Inventor: Hubert A. Schmitt, Auburn, Wash.
[73] Assignee: The Boeing Company, Seattle, Wash.
[22] Filed: Aug. 5, 1970
[21] Appl. No.: 61,153

[52] U.S. Cl. ................ 85/1 R, 85/9 R, 85/37, 287/189.36 F
[51] Int. Cl. ................ F16b 5/02, F16b 35/00
[58] Field of Search ............ 85/9 R, 1 R, 37, 85/28; 287/189.36 F, 189.36 D; 10/27 R, 10 R; 29/526

[56] References Cited
UNITED STATES PATENTS

| | | | |
|---|---|---|---|
| 2,985,898 | 5/1961 | Goude | 85/9 R X |
| 3,369,440 | 2/1968 | King | 85/9 R |
| 3,578,367 | 5/1971 | Harvill | 85/1 R X |
| 2,018,913 | 10/1935 | Cautley | 85/37 X |
| 3,034,611 | 5/1962 | Zenzic | 85/1 R X |
| 3,317,228 | 5/1967 | Storch | 85/1 R X |
| 3,440,922 | 4/1969 | Cohen | 85/9 R |
| 3,512,446 | 5/1970 | Sekhon | 85/9 R |

FOREIGN PATENTS OR APPLICATIONS

| | | | |
|---|---|---|---|
| 17,569 | 11/1889 | Great Britain | 85/37 |

Primary Examiner—Ramon S. Britts
Attorney—Glenn Orlob and Bernard A. Donahue

[57] ABSTRACT

A flush head fastener pin for use in aircraft structural joints which are countersunk for surface flushness. The pin is shaped and adapted to preload the joint material surrounding the countersink to create a predetermined residual stress pattern in that region for improvement of fatigue life. Preferred embodiments of a straight shank bolt, a tapered shank bolt, and a rivet are presented. Each pin embodiment has a 70° conical head and a concave transition portion of specified radius and smoothness interconnecting the head with the shank. The 70° head and transition portion cooperate to conformably deform and preload the countersunk region of the hole, which is preferably provided with a convex surface of specified radius at the base of the countersink, and a conical surface having a greater cone angle than that of the pin. The straight shank bolt embodiment further discloses a hardened convex lead-in portion of specified shape and smoothness extending between the shank and the threads to prevent galling of the hole during installation of the bolt.

6 Claims, 7 Drawing Figures

PATENTED JUL 31 1973 3,748,948

INVENTOR.
HUBERT A. SCHMITT
BY
Bernard A. Donahue
ATTORNEY

PATENTED JUL 31 1973　　　　　　　　3,748,948
SHEET 2 OF 2
Fig. 5.
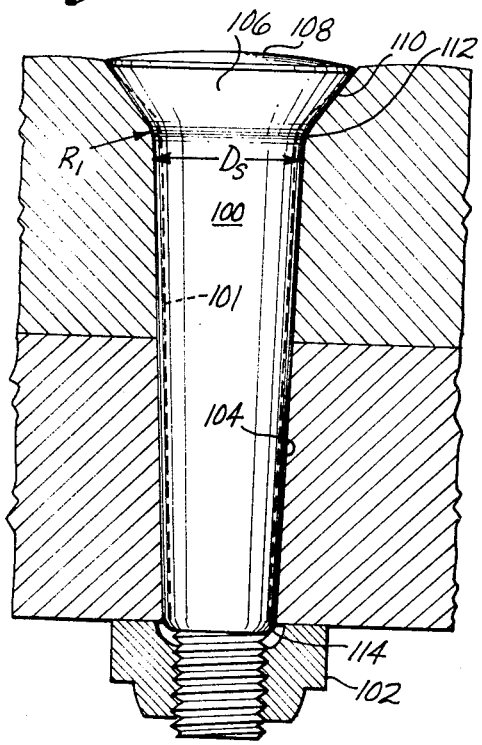
Fig. 6.
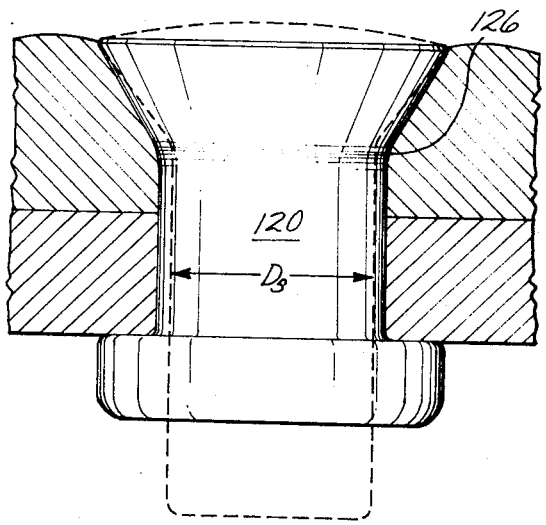
Fig. 7.
COMPARATIVE FATIGUE LIFE RANGE
FOR 2024 A1 DOG BONE TYPE SPECIMENS
INVENTOR.
HUBERT A. SCHMITT
BY
Bernard A. Donahue
ATTORNEY

FATIGUE RESISTANT FASTENERS

BACKGROUND OF THE INVENTION

1. Field of the Invention

This invention relates to fatigue resistant fastener joints for aircraft structures; and, more particularly, to a fastener pin which is shaped to create a predetermined prestressed condition in the fastened material, and to a method of construction and a joint which give optimum results with the pin.

2. Discussion of the Prior Art

At present major design and test efforts are underway in the aircraft industry to develop fastening techniques and hardware to improve the fatigue life of structural joints subjected to repetitive loadings. It has long been recognized that most fatigue cracks will develop in the vicinity of fastener holes (see, for example, "Preventing Fatigue Failures," Assembly Engineering, p. 28, May, 1968). Certain innovations, such as holes filled with interference fit or oversized fasteners, have shown fatigue life improvement over incompletely filled or open holes. An example of this type of fastener in widespread use today is found in U.S. Pat. No. 3,034,611 to Zenzic, issued May 15, 1962, in which a tapered shank is used to create an interference fit in a tapered hole of correspondingly smaller (0.001 – 0.0045 inches) diameter. Straight shank interference fit fasteners have been less widely used than tapered shank fasteners because upon installation they have demonstrated a tendency to gall the walls of the hole, thereby creating minute stress raisers which inherently cause early fatigue failures. (See, for example, "Interference Fasteners for Fatigue-Life Improvement," Experimental Mechanics, August, 1965, p. 19A. )

The increased fatigue life of interference fit fastener installations is primarily attributable to the establishment of a residual stress field or prestressed condition in the material immediately surrounding the oversized shank of the fastener pin. Such a prestressed condition tends to reduce the mean fatigue stress level and/or the alternating stress amplitude, each of which is a primary parameter in fatigue lifetime predictions.

In flush head fastener installations it has been the usual practice to use a fastener head having a 100° conical surface which matches a corresponding 100° countersunk surface in the material. In tests conducted by the inventor, it has been observed that these countersunk flush head installations often develop fatigue cracks earlier than equivalent protruding head fastener joints. This phenomenon has appeared in both tapered shank and straight shank fasteners even under closely controlled test conditions wherein a prescribed optimum degree of shank interference is achieved. The cracks most often appear to emanate directly from the area of the countersink. This is believed to result from the fact that little attention has been paid to establishing a residual stress pattern in the area of the countersink comparable to that existing in the shank area.

In a standard 100° matching cone angle installation, the fastener is normally provided with a standard minimum fillet radius between the conical head and the shank. The countersunk hole is left sharp at the intersection of the countersink surface with the shank accommodating portion of the hole. In such installations the wide 100° cone angle will produce little, if any, preload in a radial direction over the length of the countersink, even when the fastener is forced against the countersink surface and held in position. Such a preload is not at all comparable to the radial preload induced in the shank area by an interference fit of the type previously discussed.

It is a primary object of this invention to provide a novel flush head fastener pin for use in a countersunk joint wherein the pin is shaped and adapted to preload the material surrounding the countersink to create a prestressed condition which will improve the fatigue life of the joint.

A related object of this invention is to teach the use of a transition portion between the head and the shank of a flush head fastener which has a concave surface of specified curvature and smoothness for the purpose of predictably conformably deforming the countersink material of the hole to establish a prestressed condition equivalent to that obtained around the shank of an interference fit fastener.

A further related object of this invention is to provide a flush head fastener pin having a conical surface with an included cone angle of approximately 70° which coacts with a specified transition portion between the head and the shank to establish a prestressed condition around a countersunk hole which preferably is provided with a cone angle different from the cone angle of the pin.

A further related object is to teach a method of manufacturing a countersunk flush joint in which a predetermined residual stress pattern is established in the material surrounding the countersink by virtue of physical interference between a concave transition portion of specified radius on the fastener pin and a convex surface of lesser specified radius at the base of the countersunk portion of the hole.

A further object of this invention is to provide a close tolerance bolt having a specified lead-in portion between the shank and the threaded end for the purpose of preventing galling of the wall of an interference fit hole during installation of the bolt.

SUMMARY

The above objectives have been achieved in the preferred embodiments of this invention by the provision of a novel fastener pin having a conical flush head with a given included cone angle of approximately 70°, and a transition portion interconnecting the head and the shank which comprises a hardened concave surface having a specified radius of curvature and smoothness. The transition portion is shaped and adapted to contact and conformably radially expand the inner portion of the countersink, which is preferably provided with a specified convex surface and a cone angle different from that of the pin. Upon installation, these features will create a predetermined residual stress distribution in the countersink region. Two embodiments of a flush head bolt are presented; one having a straight shank and the other a tapered shank. The straight shank version is provided with a cold rolled lead-in portion, between the shank and the threaded end, tangent with the shank and having a radius of curvature in a range which is optimum for cold working and deforming the walls of the hole during installation of the fastener. A rivet embodiment incorporating the 70° head and coacting transition portion is also presented.

BRIEF DESCRIPTION OF THE DRAWINGS

FIG. 5 shows a 70° head tapered shank bolt embodiment fully installed in a countersunk hole.

FIG. 6 illustrates a 70° flush head rivet embodiment installed in a countersunk hole.

FIG. 7 is a plot of fatigue life test data comparing prior art configurations with applicant's fastener installations.

DESCRIPTION OF THE PREFERRED EMBODIMENTS

Figure 1:
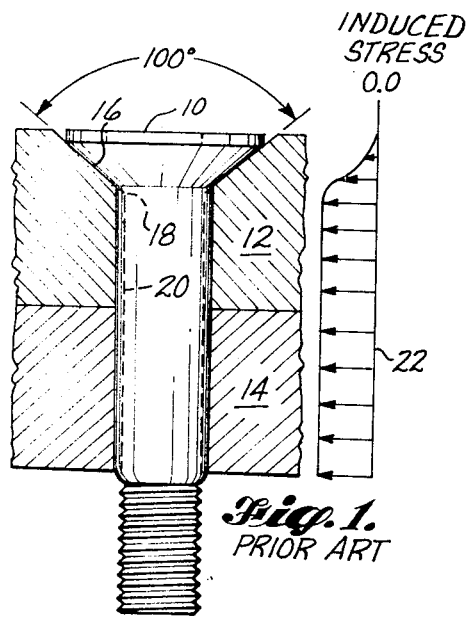
FIG. 1 schematically depicts the stress distribution and interference pattern of typical prior art 100° countersink installations.

FIG. 1 schematically depicts a typical prior art 100° conical head interference fit fastener 10 installed in a matching 100° conical countersink, thereby connecting an overlapping pair of structural members 12 and 14. The dotted lines represent the original walls of the hole which have been radially expanded to the solid line positions by the shank of the fastener 10. As is customary in such installations, the original hole is countersunk to establish a conical surface 16 which makes a sharp intersection 18 with the wall 20 of a shank accomodating portion of the hole. The fastener 10 is forced into the hole to expand and preload its wall until a predetermined residual stress condition is established. The conical head of the fastener is seated against the matching conical surface 16 of the countersink. When this is accomplished, a residual tensile stress field of the type schematically represented by the force diagram 22 will be established. The residual stress level distribution as shown by diagram 22 remains relatively constant in the shank region, but falls off sharply in the countersink region above intersection 18. The stress level can be seen to fall to a zero level in the countersink region near the face of the member 12.

Figure 2:
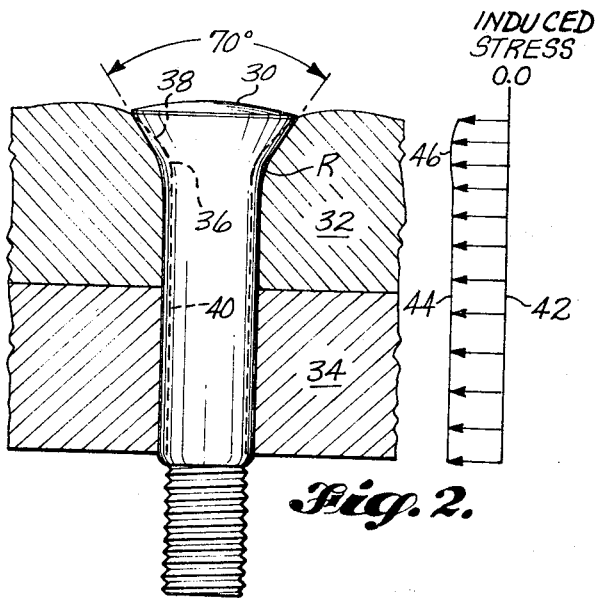
FIG. 2 is similar to FIG. 1 but is directed to applicant's 70° head fastener and illustrates the stress distribution which can be achieved when practicing this invention.

FIG. 2 schematically depicts a 70° head installation constructed according to the teachings of this disclosure which connects a pair of overlapping structural members 32 and 34. The dotted lines represent the original walls of the hole which have been expanded radially to the solid line positions established by the shank and head of the fastener 30. As will become more apparent in the discussion which follows, a convex surface 36 is established at the base of the countersink to interconnect conical surface 38 with wall 40 of the shank accommodating portion of the hole. The conical surface 38 is preferably given a somewhat greater included cone angle than that of the head of the bolt 30. The fastener head conical surface has an included cone angle of 70° and is connected to the fastener shank by a hardened transition portion having an enlarged minimum radius of curvature R and specified smoothness.

As the fastener 30 is forced into an interference fit with the walls of the hole and the countersink, the transition portion of the bolt will conformably deform the countersink wall so as to induce a residual stress field of the type schematically represented by the force diagram 42. In contradistinction to the prior art installation of FIG. 1, the stress level 44 in the shank region can be substantially duplicated by the level 46 existing over the countersink and extending to the surface region of member 32.

Figure 3:
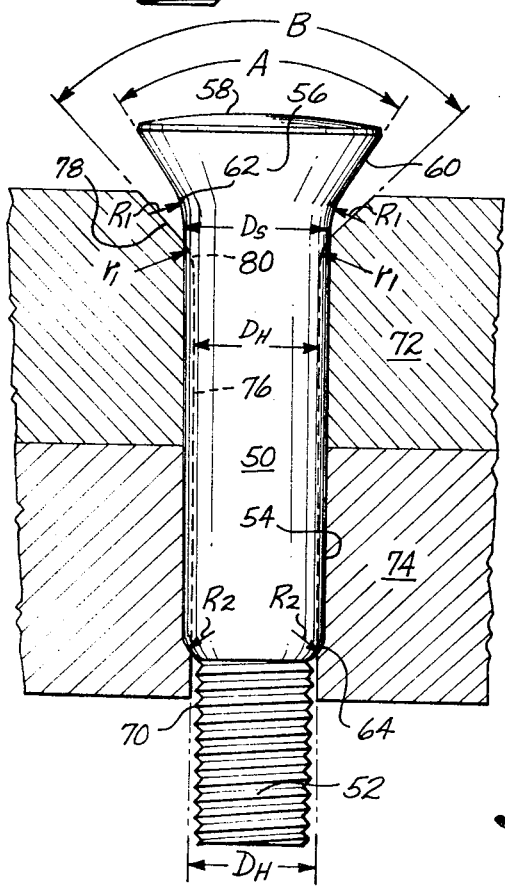
FIG. 3 is a detailed section view of applicant's straight shank interference fit bolt partially installed in a countersunk hole.

Referring now to FIG. 3, a preferred embodiment of a straight shank bolt 50 is shown in detail. The bolt 50 comprises an externally threaded fastening end means 52, a circular shank 54 having a close tolerance diameter $D_s$, a circular flush head 56 which includes a convex domed end 58 and a conical surface 60 having a given included cone angle A. The shank 54 is connected to head 56 by a transition portion 62, comprising a cold rolled smooth concave surface having an enlarged nominal radius $R_1$ which is arranged and shaped to conformably deform and prestress the walls of a countersunk surface upon installation of the bolt 50. The fastening end means 52 is connected to shank 54 by a lead-in portion 64 comprising convex surface means with a specified radius $R_2$, for coldworking and expanding the surface of the wall of the shank accommodating portion of the hole during installation of the bolt. The included cone angle A of the conical surface 60 is preferably established at approximately 70°. The 70° angle has been selected in view of the following factors: (1) a wide cone angle such as 100° which is prevalent in prior art installations offers very little wedge action of the type contemplated by this invention; (2) decreasing the cone angle will increase the stress concentration at the intersection of the conical surface and the outer surface of the member; (3) decreasing the cone angle reduces the seated bearing area and hence in a low strength material will reduce the allowable tensile load which can exist in the fastener; and of primary importance based on test results, (4) the 70° head appears to interact and cooperate most favorably with the novel enlarged radius transition portion 62 in providing a means for predictably displacing the material surrounding the countersink portion of the hole to obtain a substantially uniform residual stress distribution over the countersink region. When an enlarged radius transition portion such as contemplated by this invention is used with a fastener head having a cone angle within the range of from about 60° to 85°, a residual stress pattern giving improved fatigue life will result, even in a conventionally countersunk hole. However, a nominal value of approximately 70° appears to offer the best stress level distribution, especially when the countersunk hole is prepared in the manner to be described.

The transition portion 62 of the bolt 50 is preferably manufactured by a cold rolling process to obtain a hardened surface having smoothness characteristics superior to a surface finish of 32 Root Height Ratio (RHR) as defined by U.S. Government Military Specification MIL-STD-10, with an increased smoothness of approximately 16 RHR being preferred. The concave surface of transition portion 62 performs in the manner of a metal forming tool or die, to conformably deform the material surrounding the countersink.

The above noted smoothness characteristics, in combination with a nominal radius of curvature of a value greater than 15 percent of the shank diameter have been found to give optimum results. For small diameter bolts, a nominal radius of curvature of 0.060 inches with a tolerance of ±0.010 inches has been found to perform satisfactorily without galling or other damage when used in combination with a 70° cone angle surface on the bolt. The bolt should be constructed of a high-strength material which can be hardened by cold working and which has an ultimate shear strength in excess of 85,000 psi with correspondingly high surface bearing properties. Fasteners constructed of 6Al-4V and Beta 3 titanium have been used in combination with aluminum structural members in most of the fatigue tests conducted by applicant. Titanium or high strength steel fasteners should be used when the structural members to be joined are constructed of titanium.

The lead-in portion 64 which interconnects the bolt shank 54 and the fastening end means 52 comprises a circular convex surface of revolution precisely tangent to shank 54 and having a maximum diameter smaller than the minimum diameter of the shank. Lead-in portion 64 should be manufactured by cold rolling to a smoothness of less than 32 RHR (preferably less than 16 RHR) and formed to a nominal radius of curvature $R_2$ which falls within the range of from 20 to 60 percent of the shank diameter $D_s$. For 3/16, ¼ and 5/16 inch diameter bolts, the nominal radius used by the inventor has been standardized at 0.090 inches with a tolerance of ±0.015 inches. In the past, interference fit bolts of these diameters have been proposed which incorporate either a minimal radius (0.030 inches), an enlarged radius (approximately 70 percent of the shank diameter), or a slight taper in the lead-in region. However, microscopic analyses performed by the inventor indicate that when these bolts are used in high interference fit joints, the minimal radius tends to gall the hole by a cutting action, and the enlarged radius or the taper tends to gall by collection of minute chip particles in the small acute angle formed between the bolt lead-in surface and the walls of the hole. A bolt configuration has also been proposed which utilizes a bead of a larger diameter than the adjacent shank diameter to cold work the walls of the hole and reduce the force required to install the bolt. However, this beaded bolt inherently tends to create extremely high localized bearing pressures which could cause galling problems under certain conditions. Also, the bead configuration relies upon spring back of the hole wall as the bead passes through the hole and hence inherently requires more disturbance of the walls of the hole than does applicant's lead-in portion 64.

Applicant's bolt 50 is also provided with a crown end portion 58 having a convex surface with a minimum radius of curvature exceeding twice the shank diameter $D_s$. Although exaggerated for purposes of illustration, the radius is preferably selected such that the crown rises only 0.002 to 0.006 inches above a conventional flat head. Aerodynamic drag testing and analyses indicate improved results for this configuration when used on external surfaces, particularly when adverse tolerance conditions are considered. Also, of particular importance to high interference fit joints which require high driving forces, the convex crown curvature compensates for off-center driving forces, and serves to prevent damage caused by impact of the driving tool on the surface of the structural member.

FIG. 3 shows the bolt 50 partially installed in a hole 70 through an overlapping pair of workpieces 72 and 74. A wall 76 for hole 70 is drilled to a closely controlled diameter, $D_H$ as shown. A countersink conical surface 78, having a given cone angle B which is preferably at least 4° larger than bolt cone angle A, is machined in the surface of member 72. The wall 76 and the inner portion of the countersink conical surface 78 are interconnected by a convex surface 80 having a minimum radius of curvature $r_1$ of at least 0.015 inches, and preferably of a nominal value of 0.030 inches with a tolerance of ±0.005 inches. As noted earlier, the intersection of the conical countersink surface with the wall of the hole has normally been left sharp in prior art installations.

In FIG. 3, the lead-in portion 64 can be seen to be cold working and expanding the wall 76 as the bolt 50 is forced into the hole. The straight shank fastener of this invention was developed for relatively new and untried straight shank high interference fit installations ($D_s > D_H$ by 0.003 - 0.006 inches) in order to obtain higher level residual stress patterns in the shank region for improved fatigue life. With these high interferences, a larger driving force is required to install a straight shank fastener, and the risk of galling the hole increases. For these reasons, most prior art joints having high interference fits have used tapered shank fasteners which inherently involve higher costs. However, applicant's straight-shank lead-in portion 64 has demonstrated satisfactory results in joints having interference fits of up to 0.009 inches. Lead-in convex surface means such as here disclosed may of course be used with protruding head bolts as well as the flush head configuration shown.

Figure 4:
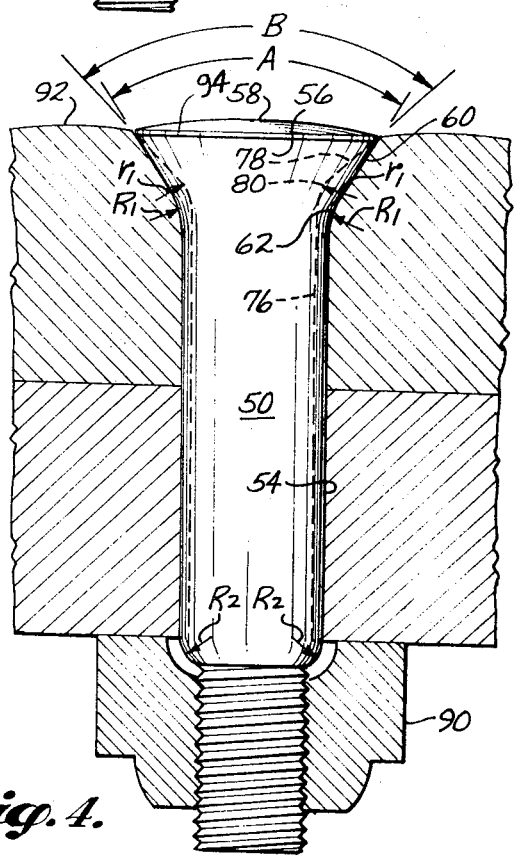
FIG. 4 corresponds to FIG. 3, but shows the bolt fully seated in the countersunk hole.

FIG. 4 shows applicant's flush head bolt 50 secured by an internally threaded nut means 90 in a seated position in the countersink. The dotted lines 76, 78 and 80 indicate the original undeformed walls of the hole which have been expanded to the position of the corresponding solid line bolt surfaces 54, 62 and 60. Although exaggerated for purposes of illustration, the difference between the dotted line and solid line positions is indicative of the type of material deformation and cold working imparted to the finished joint. Results similar to the residual stress diagram 42 of FIG. 2 have been obtained in joints using ¼ and 5/16 inch diameter bolts and the following geometric parameters: (1) a bolt head cone angle A of 70°; (2) a bolt transition portion 62 nominal radius $R_1$ of 0.060 inches; (3) a shank diameter interference of from 0.003 to 0.006 inches; (4) a countersink hole cone angle B of 82°; (5) a countersink convex surface radius $r_1$ of 0.030 inches; and (6) a lead-in portion 64 nominal radius $R_2$ of 0.090 inches.

In larger sizes (three-eighths inch and above) requiring high driving forces, countersink cone angles as low as 75° have been used with a 70° bolt to produce improved joints from a fatigue standpoint. It will become evident to those skilled in this art that various trade-offs are available in terms of the bolt radius $R_1$, the countersink radius $r_1$, the cone angles A and B, and the degree of interference between $D_s$ and $D_H$ in order to tailor a residual stress distribution extending through the countersink region of the hole. If the difference in the cone angles A and B falls below about 4°, the interference caused thereby will probably be minimal in terms of influence on the residual stress pattern, which would then be dominated by the interference due to the enlarged radius $R_1$ operating on the countersink convex surface with smaller radius $r_1$.

From FIGS. 3 and 4 it can be seen that the material surrounding the countersink has been acted upon and deformed outwardly, first by the concave surface 62 and then by that surface acting in cooperation with the 70° conical surface 60, as the bolt is forced into a seated position. The conical surface 60 serves to conformably guide the flow of material by a wedging action which assists in preloading the upper portion of the hole. A slight protuberance 92 is usually observable around the hole at the outer surface of the countersink. This is indicative that the induced residual stress distribution extends to the surface of the material in the manner desired.

A chronic problem in flush head countersunk fastener installations has been that of "end grain" corrosion due to exposure to the atmosphere of the outer portion of the hole above the conical surface of the bolt. This exposure is observable in the prior art installation of FIG. 1, and results from the provision of the flat longitudinally extending surface between the conical surface of the bolt head and its end portion. Such flat surfaces are customarily provided in order to produce a concentric fastener with a clean appearance when trimming the sharp edge at this location. In the FIG. 4 embodiment, it can be seen that Applicant has minimized this problem by requiring that the trimmed surface (at 94) be left relatively sharp; with a maximum longitudinal dimension of less than 0.005 inches, and by sizing of the bolt head and countersunk hole for an appropriate fit after installation.

Referring now to FIG. 5, a tapered bolt embodiment of applicant's flush head countersunk fastener is shown. As is noted in the Zenzic patent referenced earlier, the bolt 100 is customarily given a uniform taper of 0.020 inch per inch along its shank. A matching hole 101 is provided with a tapered wall having the same slope but correspondingly smaller diameters by a predetermined amount, usually from 0.001 to 0.0045 inch interference. The FIG. 5 tapered bolt 100 is similar to the straight shank embodiment in having a threaded fastening end means 102, a circular shank 104 with a predetermined maximum diameter $D_s$, a circular flush head 106 including a convex domed end 108 and a conical surface 110 having a given included cone angle A which is preferably approximately 70°. The shank 104 is connected to head 106 by a transition portion 112, comprising a smooth concave surface having an enlarged radius $R_1$ which is preferably of a value greater than 15 percent of the predetermined maximum diameter $D_s$. In terms of function and the resulting residual stress distribution in the countersink region, the results obtained will be similar to those discussed in connection with the straight shank embodiment. A lead-in portion 114 having a convex surface similar to surface 64 of FIG. 3 can be advantageously incorporated in the tapered shank embodiment to prevent galling during installation, an occasional problem in the lower regions of the tapered hole in certain high interference fit cases.

FIG. 6 illustrates a flush head rivet 120 constructed according to the teachings of this disclosure to establish a predetermined residual stress pattern in the countersink region for fatigue life improvement. A material such as Beta II titanium is preferably used for the rivet pin material. As discussed in connection with previous embodiments, a transition portion 126 having a concave surface of enlarged radius is used to conformably deform and preload the material surrounding the countersink as the rivet is driven into the hole. The shank diameter $D_s$ in this case need not be sized for an interference fit with the original unstressed hole. As is the usual case in rivet installations, interference can be achieved with expansion of the shank and conical head during swaging of the upset end of the rivet. The conical head portion of the rivet will tend to swell in the countersink, thereby potentially reducing or eliminating the need for a difference in cone angles A and B prior to installation. While a difference in cone angles is recommended, it may be possible with certain rivets, or other radially expanding fasteners, to markedly reduce or even eliminate this difference, depending upon the residual stress distribution desired. Conventional driving tools can be used for the FIG. 6 installation, although the required driving force will be higher, dependent upon the magnitude of the prestress induced in the countersunk region.

Referring now to FIG. 7, fatigue test results for three joints configured according to this invention are contrasted with comparable prior art joints in graphic form. At least five dogbone type specimens were identically constructed of 2024 aluminum for each type of joint. Conditions were maintained as consistent as possible during all testing, the horizontal width of each plot representing the extent of data scatter obtained. The three upper plots, labeled 200, 202 and 204, were derived from data taken from the following prior art configurations: (A) a 100° flush head tapered bolt in a matching conventional 100° countersunk hole; (B) a "beaded" 100° flush head straight shank bolt in a matching 100° hole; and (C) a conventional 100° rivet in a matching 100° hole. The three lower plots, labeled 206, 208 and 210, were derived from data taken from joints constructed according to this disclosure as follows: (1) a FIG. 3—70° flush head bolt in a countersunk hole with cone angle B = 100°; (2) a FIG. 3 — 70° flush head bolt in a countersunk hole with cone angle B = 82°; and (3) a 70° flush head rivet installed substantially as shown in FIG. 6.

The FIG. 7 data plots graphically reflect the magnitude of the improvement in fatigue life which may be obtained using fastener pins constructed according to this disclosure. For example, Applicant's rivet configuration (plot 210) shows a mean fatigue life improvement of approximately 100 percent over the prior art rivet (plot 204).

The invention has been described and illustrated in detail using certain preferred embodiments and dimensioning developed by Applicant to date. Many variations and modifications will occur to persons skilled in this art without departing from the spirit and scope of the invention. Accordingly, it is intended in the appended claims to cover all such variations and modifications.

What is claimed and desired to be secured by U.S. Letters Patent is:

1. A countersunk head bolt for connecting an overlapping pair of structural members having an aligned concentric hole passing therethrough, and for preventing development of fatigue cracks around the countersunk region; said bolt comprising: a circular shank having a predetermined maximum diameter; a circular flush head carried by one end of said shank comprising a convex crown end having a radius of curvature of at least twice said predetermined maximum diameter and a conical surface having a given included cone angle of approximately 70°; a transition portion interconnecting said head and said shank comprising a concavely curved constant radius circular surface tangent to said head and said shank and hardened by cold rolling to a surface finish smoother than 32 RHR, said circular surface having a radius of curvature of a value of greater than 15 percent of said predetermined maximum diameter; and a fastening end portion comprising an externally threaded section having a major thread diameter smaller than the minimum diameter of said shank.

2. The fastener pin of claim 1 which includes a trimmed surface between said crown end portion and said conical surface which extends longitudinally less than 0.005 inches wherein said constant radius circular surface has a radius of at least 0.060 inches.

3. The bolt of claim 1 which further includes a lead-in portion interconnecting said shank and said fastening end portion, said lead-in portion having a maximum diameter smaller than said predetermined maximum diameter of said shank and comprising a convex surface tangent to the surface of said shank and having a nominal radius of curvature within the range of from 20 to 60 percent of said maximum diameter.

4. The bolt of claim 1 wherein said shank is tapered approximately 0.020 inch per inch along the entire length of said shank and said predetermined maximum diameter is located adjacent said transition portion.

5. A countersunk head rivet constructed of a material having an ultimate shear strength exceeding 85,000 psi for connecting an overlapping pair of structural members having an aligned concentric hole passing therethrough, and for preventing development of fatigue cracks around the countersunk region; said rivet comprising: a circular cylindrical shank having a predetermined diameter; a circular flush head having a conical surface with an included cone angle of 70° held to close tolerances and a spherical convex crown end portion having a radius of curvature of at least twice said predetermined diameter; a transition portion interconnecting said head and said shank comprising a concavely curved constant radius circular surface tangent to said shank and hardened by cold rolling to a surface finish smoother than 32 RHR; and a fastening end lead-in portion comprising a convex circular surface tangent to said shank with a constant radius of curvature of a value ranging from 20 to 60 percent of said diameter; wherein said 70 cone angle and said transition portion are adapted to cooperate, upon the driving of said rivet to cause the rivet to expand to create residual stresses extending substantially throughout the countersunk region.

6. The rivet of claim 5 which includes a trimmed surface between said crown end portion and said conical surface which extends longitudinally approximately 0.005 inches.

* * * * *